(12) United States Patent
Countryman et al.

(10) Patent No.: US 6,283,151 B1
(45) Date of Patent: Sep. 4, 2001

(54) RIGID MOUNT, BREAKAWAY COUPLING

(75) Inventors: Kevin E. Countryman, Golden Valley, MN (US); Nicholas R. Hiser, Lincoln; Ruel D. Magnuson, Eagle, both of NE (US)

(73) Assignee: Parker-Hannifin Corp., Cleveland, OH (US)

( * ) Notice: Subject to any disclaimer, the term of this patent is extended or adjusted under 35 U.S.C. 154(b) by 0 days.

(21) Appl. No.: 09/783,483

(22) Filed: Feb. 14, 2001

Related U.S. Application Data (60) Provisional application No. 60/188,948, filed on Mar. 13, 2000.

(51) Int. Cl.[7] .................................................. F16L 37/28
(52) U.S. Cl. .............. 137/614.04; 137/614; 137/614.05; 137/614.06
(58) Field of Search .................... 137/614.05, 614.06, 137/614, 614.04, 614.03; 285/1

(56) References Cited

U.S. PATENT DOCUMENTS

| | | |
|---|---|---|
| 3,076,671 | 2/1963 | Freeman . |
| 3,613,726 | 10/1971 | Torres ............................. 137/614.03 |
| 3,781,039 | 12/1973 | Locke et al. ......................... 137/614 |
| 4,086,939 * | 5/1978 | Wilcox et al. .................. 137/614.03 |
| 5,323,812 * | 6/1994 | Wayne ............................ 137/614.05 |
| 5,806,564 | 9/1998 | Wilcox ........................... 137/614.05 |
| 5,937,899 | 8/1999 | Zeiber .................................. 137/614 |
| 5,996,624 * | 12/1999 | Ekman ............................ 137/614.04 |

* cited by examiner

*Primary Examiner*—A. Michael Chambers
(74) *Attorney, Agent, or Firm*—Christopher H. Hunter (57) ABSTRACT

A coupling includes a male half and a female half, where the female half has a fitting rigidly fixed to a stationary member such as an agricultural tractor. The male half can be coupled within the female half. When the male and female halves are coupled together, a valve assembly in the female half allows fluid flow through the coupling. When the male half is pulled out of the female half, the male half automatically disconnects from the female half. When the male half is removed, the valve assembly closes to prevent fluid flow through the coupling. The male half also automatically disconnects when the fluid pressure in the fluid system increases above a predetermined amount. In either case, a coupler body within the fitting moves against a centering spring to allow the male half to be removed from the female half. The selection of an appropriate centering spring determines the breakaway and overpressure release force. The male half can also be uncoupled from the female coupling half by manual manipulation of a locking collar.

20 Claims, 5 Drawing Sheets

RIGID MOUNT, BREAKAWAY COUPLING

CROSS-REFERENCE TO RELATED CASES

The present application claims priority to U.S. Provisional Application Ser. No. 60/188,948; filed Mar. 13, 2000.

FIELD OF THE INVENTION

The present invention relates generally to fluid couplings, particularly for coupling a fluid line from an apparatus such as an agricultural tractor, to a farm implement.

BACKGROUND OF THE INVENTION

Couplings for connecting fluid lines are well known and include a coupler socket (female half) and a nipple (male half). In some types of couplings, when the male half is inserted into the female half, a valve assembly in the female half opens to provide a flow path through the coupling. At the same time, a catch or coupling mechanism automatically engages the male half to retain the male half within the female half. Typically, the coupling mechanism can be manually released to disconnect the male half from the female half, at which point the valve assembly closes the flow path. Such a coupling is conventionally referred to as a "push-to-connect" coupling.

The male half of a coupling typically includes tubular valving or plug circumscribing a central passage, and a threaded fitting portion at its rear end which enables the male half to be connected to the pipe or tube. A valve assembly may also be provided in the male half. The valving of the male half narrows down at its forward end and includes an outwardly-facing circumferential groove or channel. When the male half is inserted into the female half, the coupling mechanism on the female half engages the groove on the valving to retain the male half within the female half.

One particularly useful type of push-to-connect coupling is referred to as a "flush face" coupling. In a flush face coupling, the front of the male half has a complimentary surface with the front of the female half such that the engaging surfaces of the male and female half are all flush with one another when connected. This flush face assembly is intended to prevent contaminants entering the coupler during connection and disconnection.

A number of different types of coupler sockets have been developed for receiving a male half. One known type of socket includes a cylindrical body with an internal, spring-biased poppet valve. The body of the female half has a series of tapered openings in a circumferential arrangement near the forward end, and a series of locking balls are received in the openings. A spring-biased locking collar is slidably disposed around the coupler body, and when the male valving is inserted into the socket, the locking collar forces the locking balls radially inward into the groove in the male half to lock the male half to the female half. At the same time, the poppet valve in the female half engages with a valve assembly in the male half to open a flow passage through the coupling.

To uncouple the male half from the female half, the locking collar is moved rearwardly, which allows the locking balls to move outwardly from engagement with the groove in the male half, and thereby allow the male half to be removed from the female half. As the male half is removed, the poppet valve in the female half and the valve assembly in the male half are moved to closed positions to prevent fluid flow through the respective halves of the coupling. French Patent Reference No. 1.577.931 shows such a flush-face, push-to-connect coupling.

In some applications, such as agricultural tractor applications, it can be necessary or desirable to have the coupling automatically disconnect under certain conditions, such as if an operator fails to disconnect the coupling before the tractor is driven away from an attached implement. To accomplish this breakaway feature, the locking collar of the female half of the coupling has been rigidly mounted to the tractor. When the male half is pulled away from the female half, the female body moves inside the locking collar and the coupling halves automatically disconnect.

While this solution may be appropriate for certain applications, it requires additional hose or tube to connect the female coupling body to the tractor. This increases the material, assembly and repair costs. In addition, this coupling does not allow for automatic disconnect when the pressure within the coupling increases above a predetermined amount. It can be useful or desirable to have the coupling automatically disconnect when a maximum pressure in the fluid system is reached. Still further, the male half can only be removed from the female half by pulling on the male half. This does not allow for conventional disconnect, where the operator manually moves the locking collar rearward on the coupling body to allow the male half to be disconnected.

It is therefore believed there is a demand for a further improved push-to-connect coupling which overcomes the above-described drawbacks.

SUMMARY OF THE PRESENT INVENTION

The present invention provides a new and unique push-to-connect coupling, particularly for agricultural tractor applications, where the male half of the coupling automatically disconnects from the female coupling when the male half is pulled out from the female half. The male half also automatically disconnects when a predetermined pressure is reached in the fluid system, and can be disconnected by manually moving a locking collar.

According to the present invention, the female half includes a fitting that is securely fixed directly to the tractor. There is no additional plumbing necessary between the female half and the tractor. An internal valve assembly, locking balls and a locking collar are provided within the female half. The valve assembly, locking balls and locking collar cooperate with the male half to couple the male half to the female half and to open a flow path through the coupling when connected.

The female half further includes a cylindrical coupler body which includes openings for the locking balls, as well as an annular, radially-outward projecting flange at its inner or rear end which serves as a spring stop. A centering spring urges the coupler body rearward within the fitting. When the male half is pulled out from the female half, such as if the tractor is inadvertently driven away from the farm implement, the coupler body moves against the spring until the locking balls become aligned with a ball groove in the locking collar. This allows the locking balls to move radially outward, out of engagement with the male half, such that the male half can be removed from the female half.

A further advantage is that the pressure in the coupling is applied to the female valving. This valving is pushed outwards (towards the face of the coupler) due to the pressure against an internal seal. The force created by the pressure acts against the centering spring through the valve assembly. When the pressure increases above the spring force of the centering spring, the pressure forces the coupler body forwardly in the fitting, again until the locking balls become aligned with the ball groove in the locking collar such that the male half can be removed from the female half. Thus, the male half will also automatically disconnect when the pressure within the female half increases above a predetermined amount.

The centering spring in the female half determines the breakaway and overpressure release force of the coupling. The breakaway and overpressure release force can thereby be determined by the selection of an appropriate centering spring.

A still further advantage of the present invention is that the locking collar is not fixed to the tractor. This allows the collar to be manually manipulated by the operator to disconnect the male half from the female half.

The valve assembly for the female half of the coupling includes an axiallymoveable and spring-biased cylindrical face sleeve with an annular flat front face which engages flush against the annular flat front face of the male valving; a cylindrical retainer sleeve received within the moveable face sleeve and fixed to the fitting; an axially movable and spring-biased cylindrical sealing sleeve received within the retainer sleeve; and a cylindrical valve body located centrally within the sealing sleeve and also fixed to the fitting. When the male coupling half is inserted into the female half, the valving of the male half urges the face sleeve rearwardly within the fitting. The face sleeve cooperates with the sealing sleeve to also move the sealing sleeve rearwardly within the fitting and out of sealing engagement with the valve body, to thereby open up a flow path through the coupling. When the male half is removed, the sealing sleeve seals back against the valve body to prevent fluid flow through the female half of the coupling. The valving in the male half likewise returns to a closed position. The flush engagement of the male valving with the face sleeve prevents leakage of fluid during disconnect.

As described above, the present invention thereby provides a push-to-connect coupling, particularly for agricultural tractor applications, where the male half of the coupling automatically disconnects from the female coupling when the male half is pulled out from the female half The male half also automatically disconnects when a predetermined pressure is reached in the fluid system, and can also be disconnected by manually moving a locking collar.

Further features of the present invention will become apparent to those skilled in the art upon reviewing the following specification and attached drawings.

DETAILED DESCRIPTION OF THE PREFERRED EMBODIMENT

Figure 1:
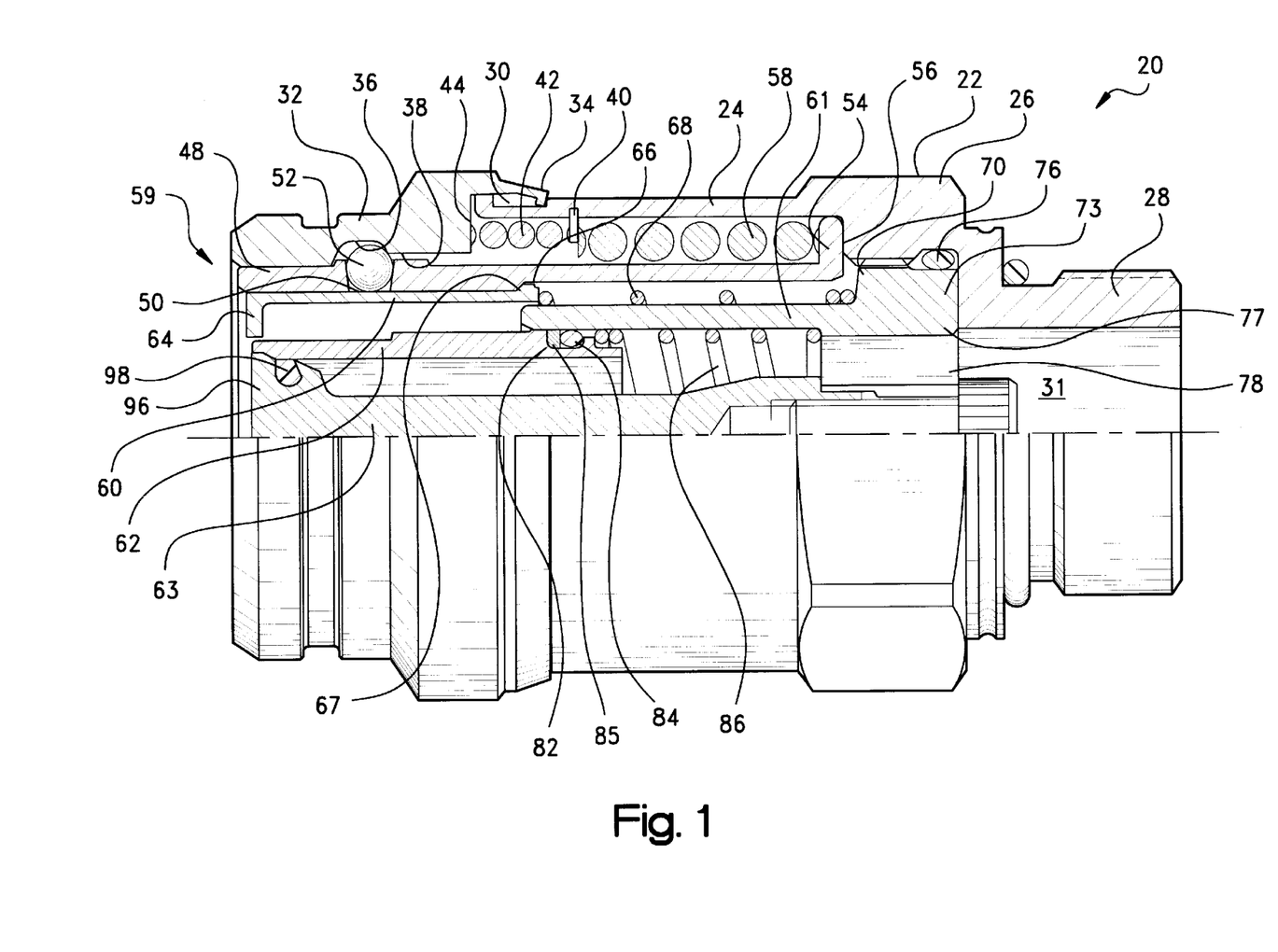
FIG. 1 is a partial cross-sectional side view of the female half of a coupling constructed according to the principles of the present invention.

Referring to the drawings, and initially to FIG. 1, the female half of a coupling constructed according to the principles of the present invention is indicated generally at 20. The female coupling half includes a fitting 22 having a cylindrical body portion 24; a tool engaging portion 26 with an outer geometry (e.g., a hexagonal configuration) appropriate for being engaged by a conventional tool; and a rear base portion 28 with outwardly-directed threads. The front end of the body portion 24 includes a circumferentially-extending and outwardly-facing channel or groove 30. The fitting further includes an internal cavity or passage 31 allowing fluid flow through the female half.

A cylindrical coupling or locking collar 32 is received on the front end of the fitting 22. The locking collar includes a standard outer, gnarled surface (not shown) for easy grip by the user. The rear end of the locking collar 32 includes a radially-inward projecting annular flange 34 which is received within the groove 30 of the fitting body 24, and which allows limited axial movement of the collar 32 with respect to the fitting 22 (i.e., within the bounds delineated between the internal end walls of the groove 30). Locking collar 32 also includes an inwardly-facing annular channel or groove 36 at about the midpoint of the collar which is sized to accept locking balls, as will be described below. An annular ledge or shoulder 38 on the inside surface of the collar 32 just rearward from ball groove 36 defines a caming surface, as will also be described below.

A retaining ring 40 is fixed within the inside of fitting body 24. A collar spring 42 is disposed between the retaining ring 40, which serves as one spring stop, and an annular inside shoulder 44 of the collar 32, which serves as a second spring stop. Collar spring 42 urges locking collar 32 forwardly in fitting 22.

A cylindrical coupler body 48 is disposed radially inward of fitting 22. Coupler body 48 includes a series of openings 50, which are tapered in the radially-inward direction to support locking balls 52. Preferably, a number of openings 50 (each with a ball 52) are provided in evenly-spaced, circumferential relation around coupler body 48. Coupler body 48 further includes a radially-outward projecting annular flange 54 at its rear end. Annular flange 54 is normally located against an annular shoulder 56 of fitting 22, and defines a first spring stop. A centering spring 58 is located against flange 54, and against retaining ring 40, which serves as a opposite spring stop for this spring, and urges coupler body 48 rearwardly within fitting 22.

The female coupling half 20 further includes a valve assembly, indicated generally at 59. The valve assembly 59 includes an axially-moveable and spring-biased cylindrical face sleeve 60; a cylindrical retainer sleeve 61 received within the face sleeve and fixed to the fitting 22; an axially movable and spring-biased cylindrical sealing sleeve 62 received within the retainer sleeve; and a cylindrical valve body 63 located centrally within the sealing sleeve and also fixed to the fitting.

The cylindrical face sleeve 60 is closely received with coupler body 48, and moves axially with respect thereto. Face sleeve 60 includes an annular, radially-inward directed annular flange 64 at its front end, and a radially-outward directed annular flange 66 at its rear end. Rear flange 66 is designed to engage a radially-inward projecting annular shoulder 67 on coupler body 48 to limit the forward movement of face sleeve 60 with respect to the coupler body. An outer sleeve spring 68 urges the face sleeve 60 forwardly within the body. Spring 68 is disposed between the rear end of face sleeve 60, which defines a first spring stop, and a radially-outward projecting annular shoulder 70 on a retainer sleeve 61, which defines a second spring stop for this spring.

Retainer sleeve 61 is closely received within face sleeve 60, and includes an rear threaded base portion 73 which is received within a threaded portion of fitting 22, to fix the retainer sleeve 61 with respect to the fitting 22. An O-ring gasket 76 is provided between retainer sleeve 61 and fitting 22 to provide a fluid-tight seal. Sleeve 61 includes a radially-inward projecting spoke portion 77 which includes a series of axial passages 78 for fluid flow.

The cylindrical sealing sleeve 62 is closely received within retainer sleeve 61, and has an annular, outwardly-facing groove 82 at its inner end which receives an O-ring gasket 84. Gasket 84 provides a fluid-tight seal between sealing sleeve 62 and retainer sleeve 61. A back-up washer 85 is also preferably provided in groove 82 forwardly of gasket 84 to add strength and rigidity to the gasket. An inner sleeve spring 86 urges sealing sleeve 62 forwardly within fitting 22, and is disposed against the rearward end of sealing sleeve 62 defining a first spring stop, and spider 77 of retainer sleeve 61, defining a second spring stop.

Finally, valve body 63 is centrally received within fitting 22 and fixed to spider 77 of retainer sleeve 61, such that the valve body 63 is likewise fixed with respect to fitting 22. Valve body 63 includes an enlarged forward valve head 96 with a flat front face, and an annular gasket 98 is provided in a groove in the valve head 96 to provide a fluid-tight seal with sealing sleeve 62. When the female half is uncoupled, the inner sleeve spring 86 urges sealing sleeve 62 against central valve body 63 to prevent fluid passing through the coupling.

Figure 2:
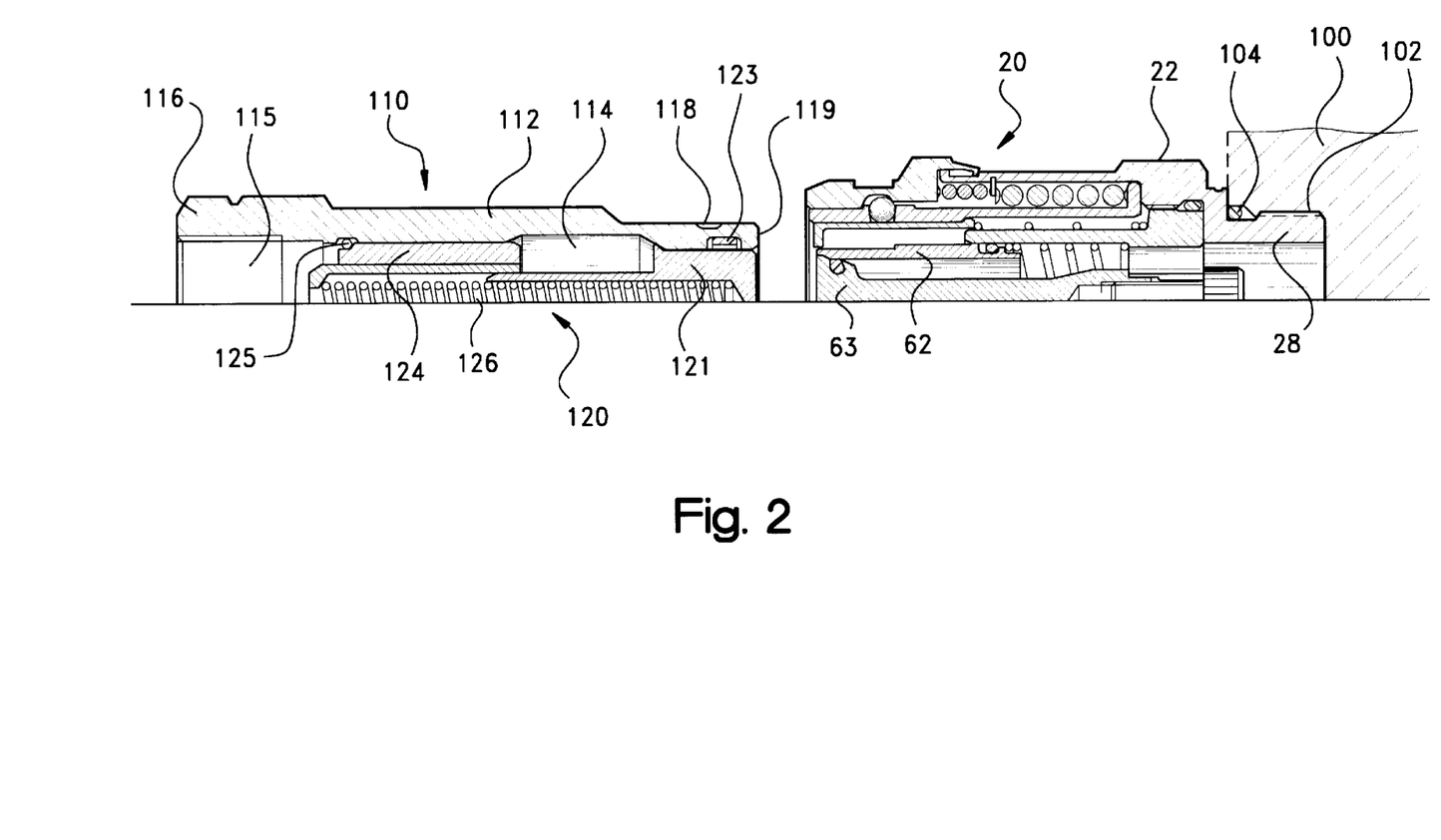
FIG. 2 is a cross-sectional side view of a portion of the entire coupling, shown disconnected and with the female half fixed to a tractor.

As shown in FIG. 2, the female coupling half 20 is fixed directly to a stationary component 100 (e.g., to an appropriate portion of an agricultural tractor). The threaded base 28 of the fitting 22 is threadably received within a correspondingly threaded cavity 102 in component 100. An O-ring 104 can be provided between base 28 and component 100 to provide a fluid-tight seal. While the present invention is particularly useful when the female coupling half is attached to a tractor, it should be appreciated that this is only one application for the coupling, and that the coupling can be used in other applications, such as in other stationary applications other than tractors, as well as in non-stationary applications such as where the female half is connected to a hose or pipe.

A male coupling half, indicated generally at 110, is received within the female coupling half 20. Male coupling half 110 includes a cylindrical valve or plug 112 defining an inner fluid passage 114. The rear end 116 of the male half can include an internal threaded portion 115 to enable the male half to be easily connected to a pipe or tube or other location within the fluid system. The rear end 116 also preferably has an outer geometry (e.g., a hexagonal geometry) to enable the male half to be easily connected to and unconnected from the pipe or tube with a conventional tool. The male half further includes an outwardly-facing, circumferentially-extending channel or groove 118 near its front end, and a flat annular front surface 119.

A valve assembly, indicated generally at 120, can be provided in the male half. Valve assembly 120 includes a hollow poppet valve 121 with a flat front face, that is moveably disposed in plug 112 toward the forward end of the male half. A seal 123 is provided between poppet valve 121 and plug 112. An annular guide 124 is held by a locking ring 124 to plug 112. A spring 125 is held between guide 123 and poppet valve 121, and biases poppet valve 121 forwardly in the plug 112, so that the forward surface 122 of poppet valve 121 is normally essential flush with surface 119 of plug 112 and the male half is fluidly closed. The male half is preferably conventional in nature, and will not be described further for sake of brevity.

Figures 3, 5:
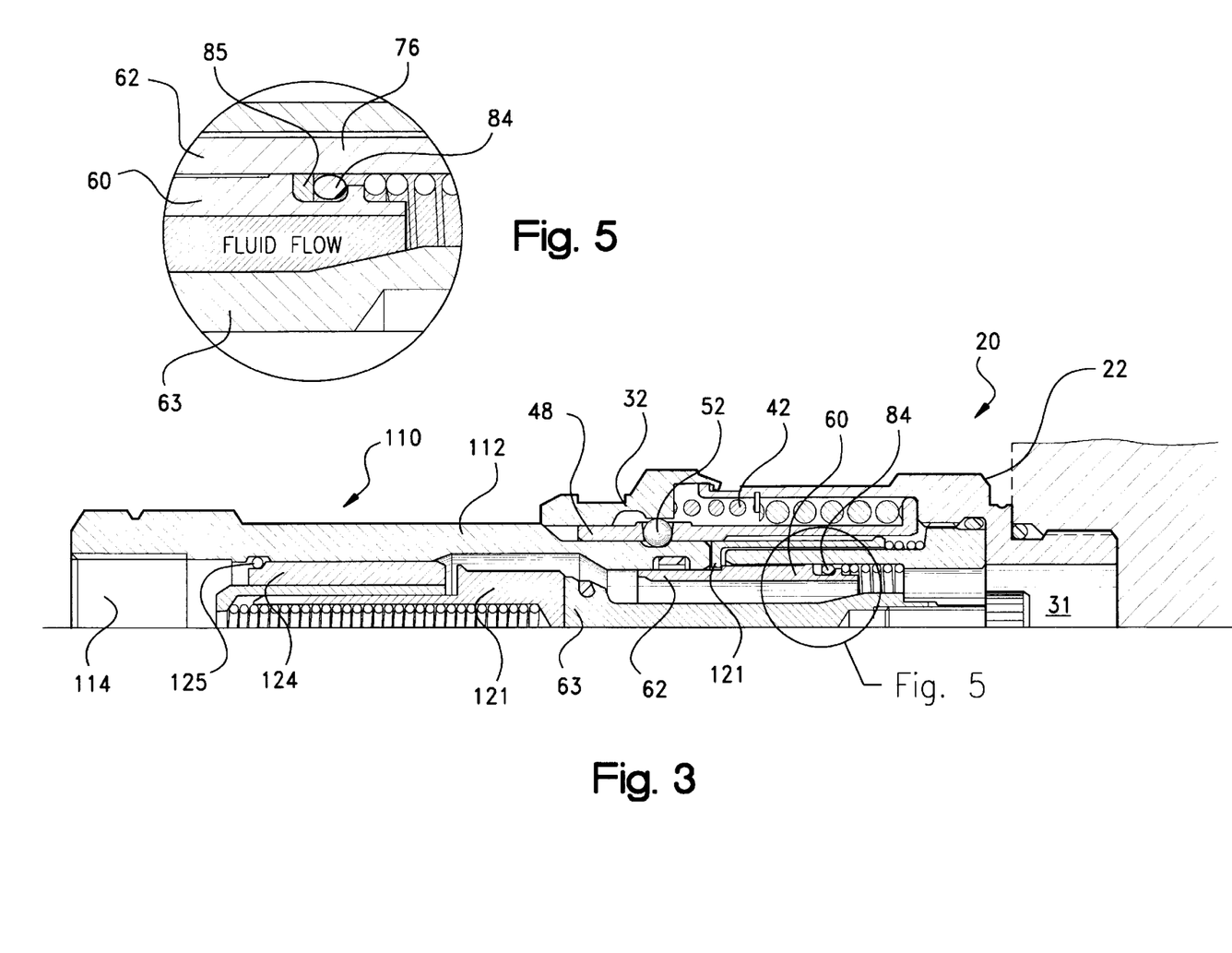
FIG. 3 is a cross-sectional side view of the coupling, shown with the female half connected to the male half.
FIG. 5 is an enlarged, cross-sectional side view of a portion of the coupling of FIG. 3.

Referring now to FIG. 3, the male half 110 is shown inserted into the female half 20. The flat front face of the male valve 112 engages the flat front flange 64 of face sleeve 60, and forces the face sleeve 60 rearwardly within the fitting. At the same time, valve body 63 in female half 20 engages poppet valve 121 in the male half and moves the poppet valve 121 into an open position. The face sleeve 60 is urged by the male half against outer sleeve spring 68, and is pushed rearwardly until flange 64 of the face sleeve engages an outwardly-facing annular shoulder 128 on sealing sleeve 62 to also move sealing sleeve 62 rearwardly within the fitting. When the sealing sleeve moves rearwardly, it moves out of sealing engagement with valve body 63 to thereby open a flow path through passage 31 of fitting 22 to the passage 114 of the male half 110. Also when face sleeve 60 is urged rearwardly, the flange 64 of the face sleeve moves past the locking balls, which thereby allows balls 52 to be urged radially inward by the caming surface 38 (FIG. 1) of the locking collar 32, and into engagement with the locking groove 118 in the male half 110. The locking collar is retained over the balls by spring 42 to keep the balls engaged with the locking groove in the male half, and thereby fixedly retain the male half 110 within the female half 20. The coupling is thereby fully open with the male coupling half coupled to the female coupling half.

Figure 4:
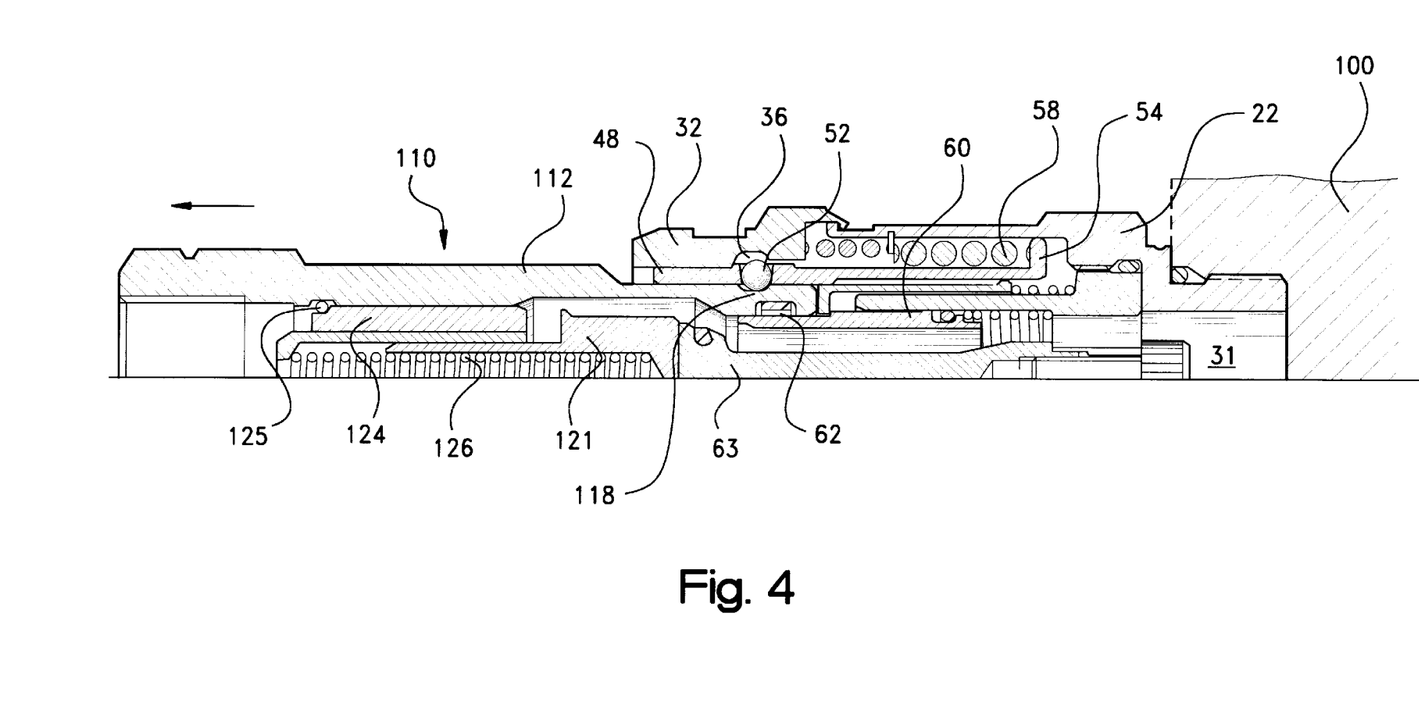
FIG. 4 is a cross-sectional side view of a portion of the coupling, illustrating the coupling in an overpressure condition.

Referring now to FIG. 4, the breakaway feature of the coupling is illustrated. As the male half 110 is moved away from the female half 120 (such as if a tractor is driven away from an implement without disconnecting the coupling), the male valve 112 urges coupler body 48 (through the engagement of balls 52) outwardly from the fitting. The coupler body compresses centering spring 58. When the force pulling on the male half overcomes the force of spring 58, the male half moves outwardly from the female half until the locking balls become aligned with ball groove 36 in locking collar 32. At this point the locking balls are urged radially outward into the ball groove by the tapered or beveled surfaces of the groove 118 in the male valving, which allows the male half to be removed from the female half. As the male half 110 is removed from the female half, inner sleeve spring 86 causes sealing sleeve 62 to move forwardly within the fitting 22, and seal against the valve body 63 to close the fluid path through the female half. The poppet valve 121 in the male half likewise returns to its closed position. The breakaway point of the coupling can be controlled through the selection of a centering spring with an appropriate spring force.

The overpressure feature of the coupling is illustrated in FIG. 5. As the pressure increases within the fluid system, the pressure within passage 31 of the female half is applied against seal 84 and against the rear end of sealing sleeve 62. The pressure forces sealing sleeve 62 outwardly from the fitting, which through its engagement with face sleeve 60 (through shoulder 128), forces face sleeve 60, and hence valve 112 of the male half, outwardly from the female half. This in turn (through locking balls 52) forces coupler body 48 outwardly from the fitting, which causes the flange 54 at the rear end of the coupler body to compress centering spring 58. When the pressure increases above the force of spring 58, coupler body 48 moves forwardly in the same manner as described above, until locking balls 52 become aligned with ball groove 36 in locking collar 32 to allow male coupling half 110 to be removed from the female coupling half 120. When the male half 110 is removed from the female half, the sealing sleeve 62 seals against the valve body 63 to close the fluid path through the female half, while poppet valve 121 closes the flow path through the male half. The disconnect pressure can also be controlled through the selection of a centering spring with an appropriate spring force.

Figure 6:
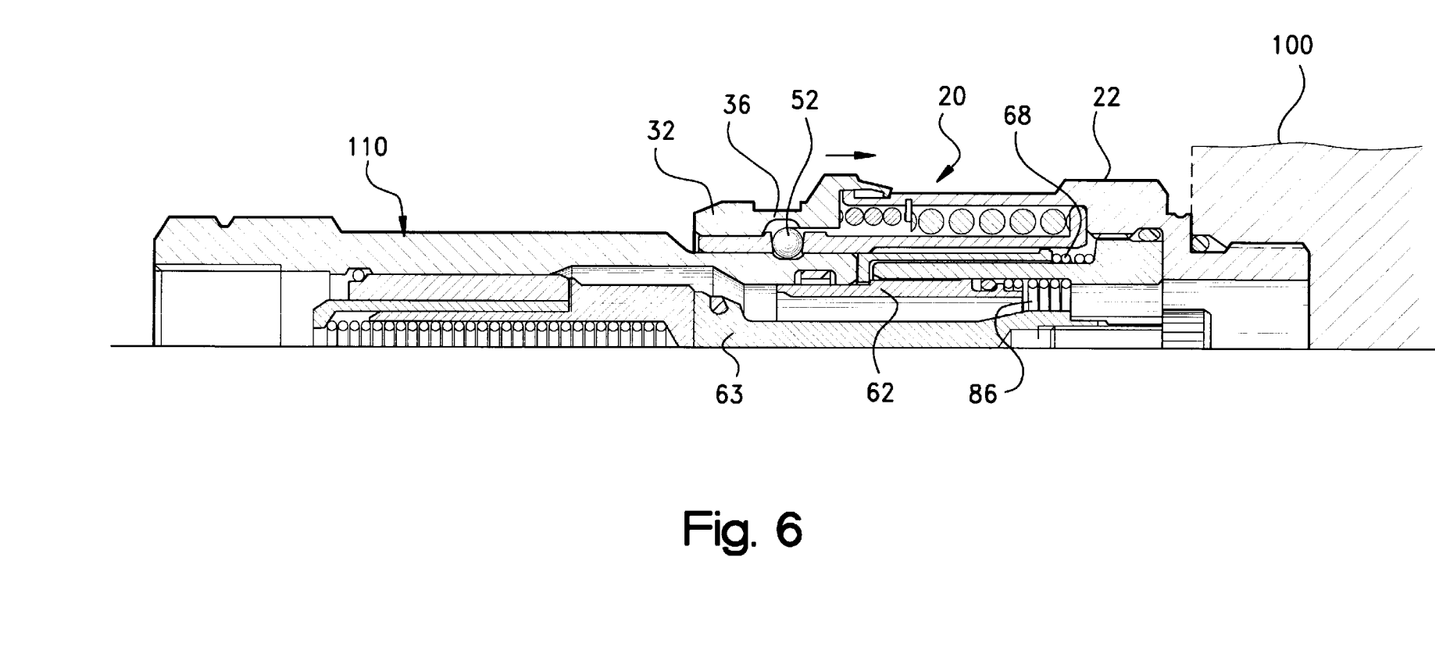
FIG. 6 is a cross-sectional side view of the coupling, illustrating the manual disconnection of the male half from the female half.

Referring now to FIG. 6, when male coupling half 110 is coupled to female coupling half 20, the male coupling half 110 can still be disconnected by manual manipulation of locking collar 32. Moving locking collar 32 axially rearward on fitting 22 allows locking balls 52 to become aligned with groove 36, which thereby allows the balls to move radially outward into ball groove 36, and thereby allow the male half 110 to be removed from the female half 20. Outer sleeve spring 68 assists in moving the male coupling half outwardly from the female coupling half, and as the male coupling half is removed, sealing sleeve 62 seals against valve body 63 to close the flow path through the female half, while poppet valve 121 closes the flow path through the male half.

When the female coupling half is plumbed to hose or pipe (rather than to a stationary object such as a tractor), the breakaway feature may or may not be useful, however the overpressure and manual disconnect will still be available.

Thus, as described above, a novel and unique push-to-connect coupling is provided, particularly for agricultural tractor applications, where the male half of the coupling automatically disconnects from the female coupling when the male half is pulled away from the female half. The male half automatically disconnects when a predetermined pressure is reached in the fluid system, and can be disconnected by manually moving a locking collar.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A female coupling half, comprising
    i) a fitting having a cylindrical body and attachment means at a rear end of the body for rigidly attaching the fitting to a stationary device, ii) a locking collar axially moveable relative to the fitting at a front end of the fitting body, the locking collar including a ball groove formed on an inner surface that can receive locking balls, iii) a collar spring urging the locking collar forwardly in the fitting, iv) a cylindrical coupler body axially moveable relative to the fitting received in the fitting body, said coupler body having a series of locking ball openings toward a front end, v) a series of locking balls received in the locking ball openings in the coupler body, vi) a centering spring urging the coupler body rearward in the fitting such that the ball groove in the locking collar is normally axially aligned with the locking balls and the locking balls are received in the ball groove, and vii) a valve assembly axially moveable relative to the fitting received in the coupler body; the valve assembly moveable rearwardly in the female half, and the locking balls, when the valve assembly is moved rearwardly, moveable radially inward by the locking collar; and the coupler body moveable against the centering spring such that the locking balls can become axially aligned with the ball groove in the locking collar and the locking balls can be urged radially outward into the ball groove in the locking collar.

2. The coupling half as in claim 1, wherein said coupler body includes an annular flange at one end defining a first spring stop for the centering spring.

3. The coupling half as in claim 2, wherein a retaining ring is provided internally to the fitting and defines a second spring stop for the centering spring.

4. The coupling half as in claim 3, wherein the retaining ring also defines a spring stop for the collar spring.

5. The coupling half as in claim 1, wherein the valve assembly has an annular flat iron face.

6. A female coupling half, comprising:
    i) a fitting having a cylindrical body and an attachment device at a rear end of the fitting, ii) a locking collar axially moveable relative to the fitting at a front end of the fitting body, the locking collar including a ball groove formed on an inner surface that can receive locking balls, iii) a collar spring urging the locking collar forwardly in the fitting, iv) a cylindrical coupler body axially moveable relative to the fitting received in the fitting body, said coupler body having a series of locking ball openings toward a front end, v) a series of locking balls received in the locking ball openings in the coupler body, vi) a centering spring urging the coupler body rearward in the fitting such that the ball groove in the locking collar is normally axially aligned with the locking balls and the locking balls are received in the ball groove, vii) a face sleeve axially moveable relative to the fitting received in the coupler body, said face sleeve including a cylindrical body with a front face engageable with a male coupling half, viii) a sleeve spring urging the face sleeve forwardly in the fitting, ix) a retainer sleeve received in the face sleeve, the retainer sleeve having a cylindrical body fixed relative to the fitting, x) a sealing sleeve axially moveable relative to the fitting received in the retainer sleeve, and xi) a valve body received in the sealing sleeve and also fixed relative to the fitting, the valve body having a front end normally in sealing engagement with the sealing sleeve; the face sleeve moveable rearwardly in the fitting and cooperating with the sealing sleeve to move the sealing sleeve rearwardly in the fitting and out of sealing engagement with the valve body, and the locking balls, when the face sleeve is moved rearwardly, moveable radially inward by the locking collar; and the coupler body moveable against the centering spring such that the locking ball openings can become axially aligned with the ball groove in the locking collar and the locking balls can be urged radially outward into the ball groove in the locking collar.

7. The coupling half as in claim 6, wherein said coupler body includes an annular flange at one end defining a first spring stop for the centering spring.

8. The coupling half as in claim 7, wherein a retaining ring is provided internally to the fitting and defines a second spring stop for the centering spring.

9. The coupling half as in claim 8, wherein the retaining ring also defines a spring stop for the collar spring.

10. The coupling half as in claim 6, wherein the face sleeve has an annular flat front face.

11. A coupling having a male half and a female half,
    the male half including a cylindrical valve with a flat front face, and a locking groove formed on an outer surface of the cylindrical valve toward the front face; and the female half including i) a fitting having a cylindrical body and attachment means at a rear end of the fitting for rigidly attaching the fitting to a stationary device, ii) a locking collar axially moveable relative to the fitting at a front end of the fitting body, the locking collar including a ball groove formed on an inner surface that can receive locking balls, iii) a collar spring urging the locking collar forwardly in the fitting, iv) a cylindrical coupler body axially moveable relative to the fitting received in the fitting body, said coupler body having a series of locking ball openings toward a front end, v) a series of locking balls received in the locking ball openings in the coupler body, vi) a centering spring urging the coupler body rearward in the fitting such that the ball groove in the locking collar is normally axially aligned with the locking balls and the locking balls are received in the ball groove, and vii) a valve assembly axially moveable relative to the fitting received in the coupler body, said valve assembly engageable with the front face of the male half when the male half is inserted into the female half; the male half moving the valve assembly rearwardly in the female half when the male half is inserted into the female half, and the locking balls, when the valve assembly is moved rearwardly, becoming axially aligned with the locking groove in the cylindrical valve such that the locking balls can be urged radially inward by the locking collar into the locking groove in the cylindrical valve to couple the male half to the female half; and the male half, when pulled outwardly from the female half, moving the coupler body against the centering spring such that the locking ball openings become axially aligned with the ball groove in the locking collar and the cylindrical valve of the male half urging the locking balls radially outward into the ball groove in the locking collar such that the male half is uncoupled from the female half and can be removed from the female half.

12. The coupling as in claim 11, wherein said coupler body includes an annular flange at one end defining a first spring stop for the centering spring.

13. The coupling as in claim 12, wherein a retaining ring is provided internally to the fitting and defines a second spring stop for the centering spring.

14. The coupling as in claim 13, wherein the cylindrical valve has an annular flat front face, and the cylindrical valve has a corresponding annular flat front face.

15. The coupling as in claim 11, wherein the retaining ring also defines a spring stop for the collar spring.

16. A coupling having a male half and a female half, the male half including a cylindrical valve with a front face, and a locking groove formed on an outer surface of the cylindrical valve toward the front face; and the female half including i) a fitting having a cylindrical body and an attachment device at a rear end of the fitting, ii) a locking collar axially moveable relative to the fitting at a front end of the fitting body, the locking collar including a ball groove formed on an inner surface that can receive locking balls, iii) a collar spring urging the locking collar forwardly in the fitting, iv) a cylindrical coupler body axially moveable relative to the fitting received in the fitting body, said coupler body having a series of locking ball openings toward a front end, v) a series of locking balls received in the locking ball openings in the coupler body, vi) a centering spring urging the coupler body rearward in the fitting such that the ball groove in the locking collar is normally axially aligned with the locking balls and the locking balls are received in the ball groove, vii) a face sleeve axially moveable relative to the fitting received in the coupler body, said face sleeve including a cylindrical body with a front face engageable with the front face of the male half when the male half is inserted into the female half, viii) a sleeve spring urging the face sleeve forwardly in the fitting, ix) a retainer sleeve received in the face sleeve, the retainer sleeve having a cylindrical body fixed relative to the fitting, x) a sealing sleeve axially moveable relative to the fitting received in the retainer sleeve, and xi) a valve body received in the sealing sleeve and also fixed relative to the fitting, the valve body having a front end normally in sealing engagement with the sealing sleeve; the male half moving the face sleeve rearwardly in the fitting when the male half is inserted into the female half, the face sleeve cooperating with the sealing sleeve and moving the sealing sleeve rearwardly in the fitting and out of sealing engagement with the valve body when the male half is inserted in the female half, and the locking balls, when the face sleeve is moved rearwardly, becoming axially aligned with the locking groove in the cylindrical valve such that the locking balls can be urged radially inward by the locking collar into the locking groove in the cylindrical valve to couple the male half to the female half; and the male half, when pulled outwardly from the female half, moving the coupler body against the centering spring such that the locking balls become axially aligned with the ball groove in the locking collar and the cylindrical valve of the male half urging the locking balls radially outward into the ball groove in the locking collar such that the male half is uncoupled from the female half and can be removed from the female half.

17. The coupling as in claim 16, wherein said coupler body includes an annular flange at one end defining a first spring stop for the centering spring.

18. The coupling as in claim 17, wherein a retaining ring is provided internally to the fitting and defines a second spring stop for the centering spring.

19. The coupling as in claim 18, wherein the retaining ring also defines a spring stop for the collar spring.

20. The coupling as in claim 16, wherein the cylindrical valve has an annular flat front face, and the face sleeve has a corresponding annular flat front face.

* * * * *